US009862492B2

(12) United States Patent
Trail

(10) Patent No.: US 9,862,492 B2
(45) Date of Patent: Jan. 9, 2018

(54) PANEL ASSEMBLY

(71) Applicant: Thompson Aero Seating Limited, Portadown, County Armagh (GB)

(72) Inventor: Thomas Trail, Kilkeel (GB)

(73) Assignee: Thompson Aero Seating Limited, Portadown, County Armagh (GB)

( * ) Notice: Subject to any disclaimer, the term of this patent is extended or adjusted under 35 U.S.C. 154(b) by 0 days.

(21) Appl. No.: 14/870,210

(22) Filed: Sep. 30, 2015

(65) Prior Publication Data

US 2016/0090182 A1    Mar. 31, 2016

(30) Foreign Application Priority Data

Sep. 30, 2014 (GB) .................................. 1417241.5

(51) Int. Cl.
| | | |
|---|---|---|
| A47C 9/00 | (2006.01) | |
| B64D 11/06 | (2006.01) | |
| B68G 13/00 | (2006.01) | |
| B29C 43/08 | (2006.01) | |
| B29K 105/04 | (2006.01) | |
| B29L 31/58 | (2006.01) | |
| A47C 5/00 | (2006.01) | |
| A47C 5/12 | (2006.01) | |
| A47C 7/22 | (2006.01) | |

(Continued)

(52) U.S. Cl.
CPC .......... B64D 11/0647 (2014.12); B29C 43/08 (2013.01); B64D 11/0604 (2014.12); B68G 13/00 (2013.01); *A47C 5/00* (2013.01); *A47C 5/06* (2013.01); *A47C 5/12* (2013.01); *A47C 5/125* (2013.01); *A47C 7/18* (2013.01); *A47C 7/185* (2013.01); *A47C 7/22* (2013.01); *A47C 7/24* (2013.01); *A47C 7/26* (2013.01); *A47C 7/347* (2013.01); *B29K 2105/046* (2013.01); *B29L 2031/58* (2013.01); *Y02T 50/46* (2013.01)

(58) Field of Classification Search
CPC .... A47C 5/12; A47C 5/00; A47C 5/06; A47C 5/125; A47C 7/185; A47C 7/18; A47C 7/24; A47C 7/22; A47C 7/26; A47C 7/347; B64D 11/0647
USPC ............ 297/452.55, 452.56, 452.14, 452.61, 297/452.57, 452.58, 452.59, DIG. 1, 297/218.5, 218.2, 445.1, 452.38, 218.1
See application file for complete search history.

(56) References Cited

U.S. PATENT DOCUMENTS 3,281,185 A    10/1966 Albinson et al.
3,423,775 A *   1/1969 Cockerill ................. A47C 7/02
                                                      297/218.5

(Continued)

FOREIGN PATENT DOCUMENTS

EP    2457831    5/2012
GB     923353    4/1963

OTHER PUBLICATIONS

European Search Report corresponding to European Application No. 15186281, dated Dec. 18, 2015.

*Primary Examiner* — Chi Q Nguyen
(74) *Attorney, Agent, or Firm* — Gardner, Linn, Burkhart & Flory, LLP

(57) ABSTRACT

An upholstered panel assembly includes an upholstery component having a foam layer provided on a substrate layer. The upholstery component covers the face of a base structure and is retained releasably by clips. The clips extend along the edges of the panel assembly. The panel assembly may be particularly suitable for aircraft cabins.

20 Claims, 4 Drawing Sheets

(51) Int. Cl.
*A47C 5/06* (2006.01)
*A47C 7/24* (2006.01)
*A47C 7/18* (2006.01)
*A47C 7/26* (2006.01)
*A47C 7/34* (2006.01)

(56) References Cited

U.S. PATENT DOCUMENTS

| | | | | |
|---|---|---|---|---|
| 4,396,226 | A * | 8/1983 | Haack | A47C 31/023 |
| | | | | 297/452.57 |
| 4,432,521 | A * | 2/1984 | Douglas | A45C 11/04 |
| | | | | 211/85.1 |
| 4,892,355 | A * | 1/1990 | Fend | A47C 5/06 |
| | | | | 297/440.22 |
| 5,601,333 | A * | 2/1997 | Bostrom | A47C 31/06 |
| | | | | 297/218.1 |
| 6,241,188 | B1 * | 6/2001 | Simpson | B60N 2/6027 |
| | | | | 244/122 R |
| 6,726,278 | B1 * | 4/2004 | Albright | A47C 3/18 |
| | | | | 297/218.1 |
| 7,775,589 | B1 * | 8/2010 | Cvek | A47C 31/023 |
| | | | | 297/218.2 |
| 7,891,735 | B2 * | 2/2011 | Oku | B60N 2/5825 |
| | | | | 297/218.3 |
| 8,979,195 | B2 * | 3/2015 | Itakura | B60N 2/6027 |
| | | | | 297/218.2 |
| 2012/0133192 | A1 * | 5/2012 | Simpson | A63H 5/04 |
| | | | | 297/452.38 |
| 2014/0265482 | A1 * | 9/2014 | Daley | B60N 2/5816 |
| | | | | 297/219.1 |

* cited by examiner

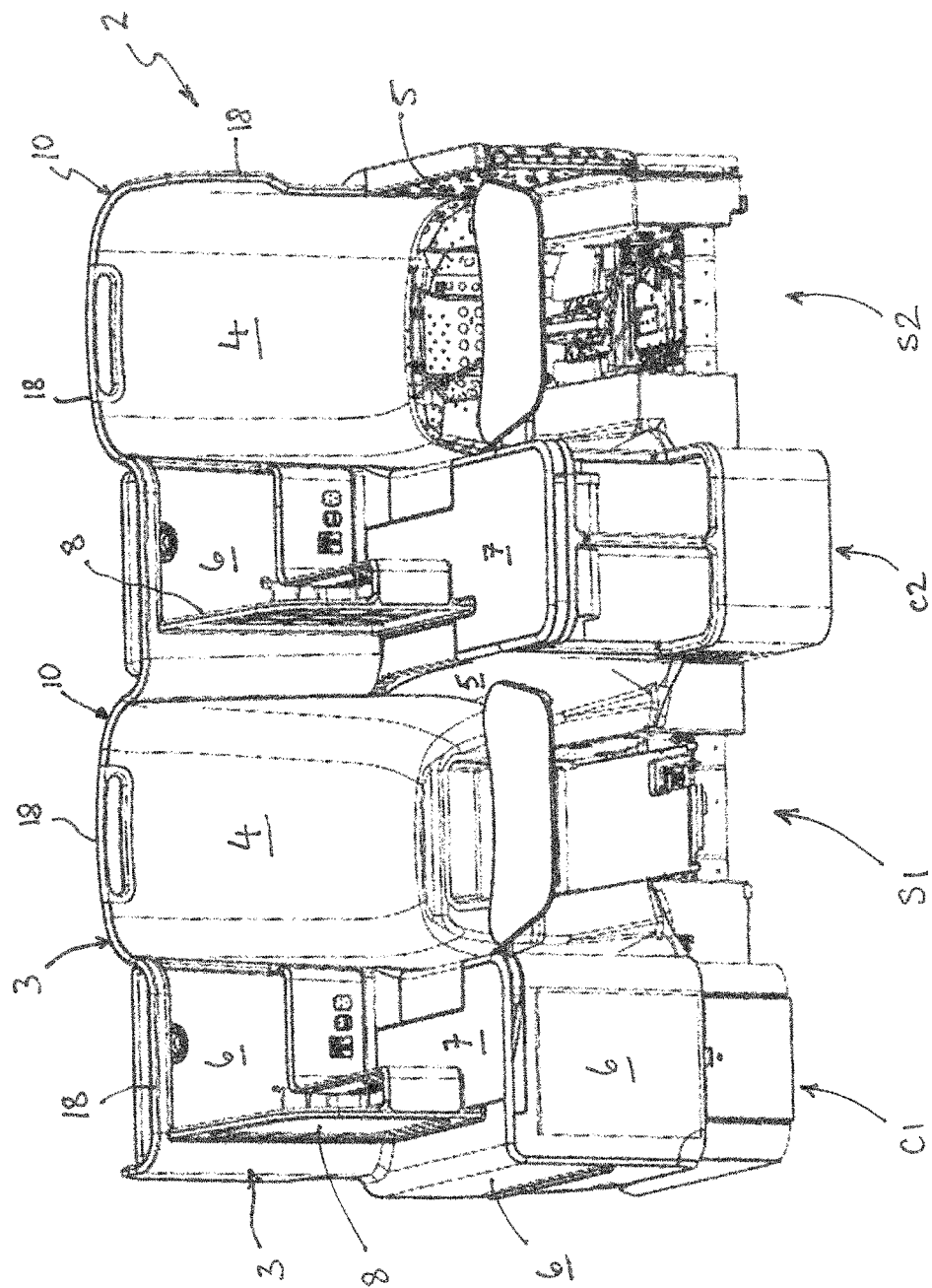

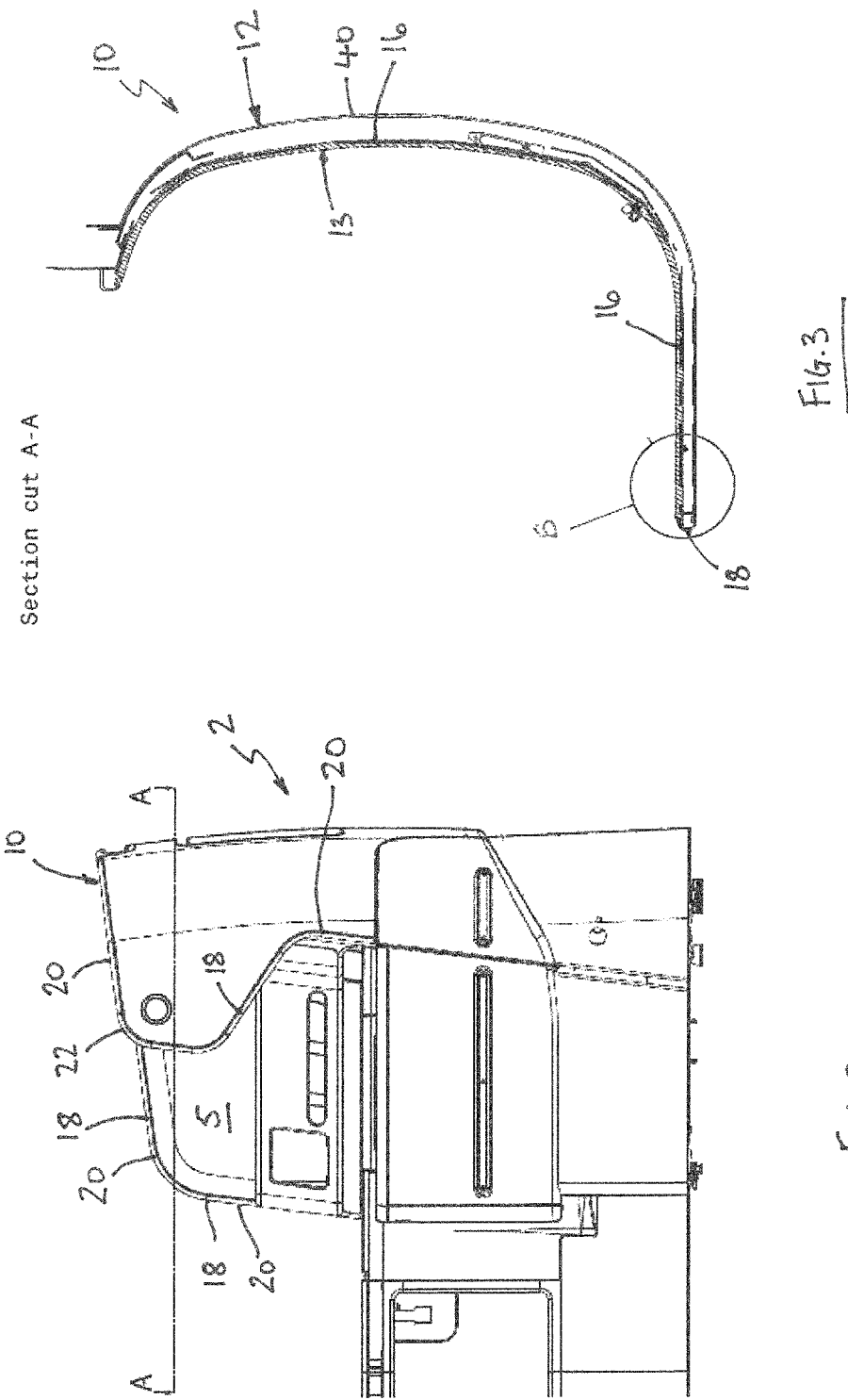

DETAIL B

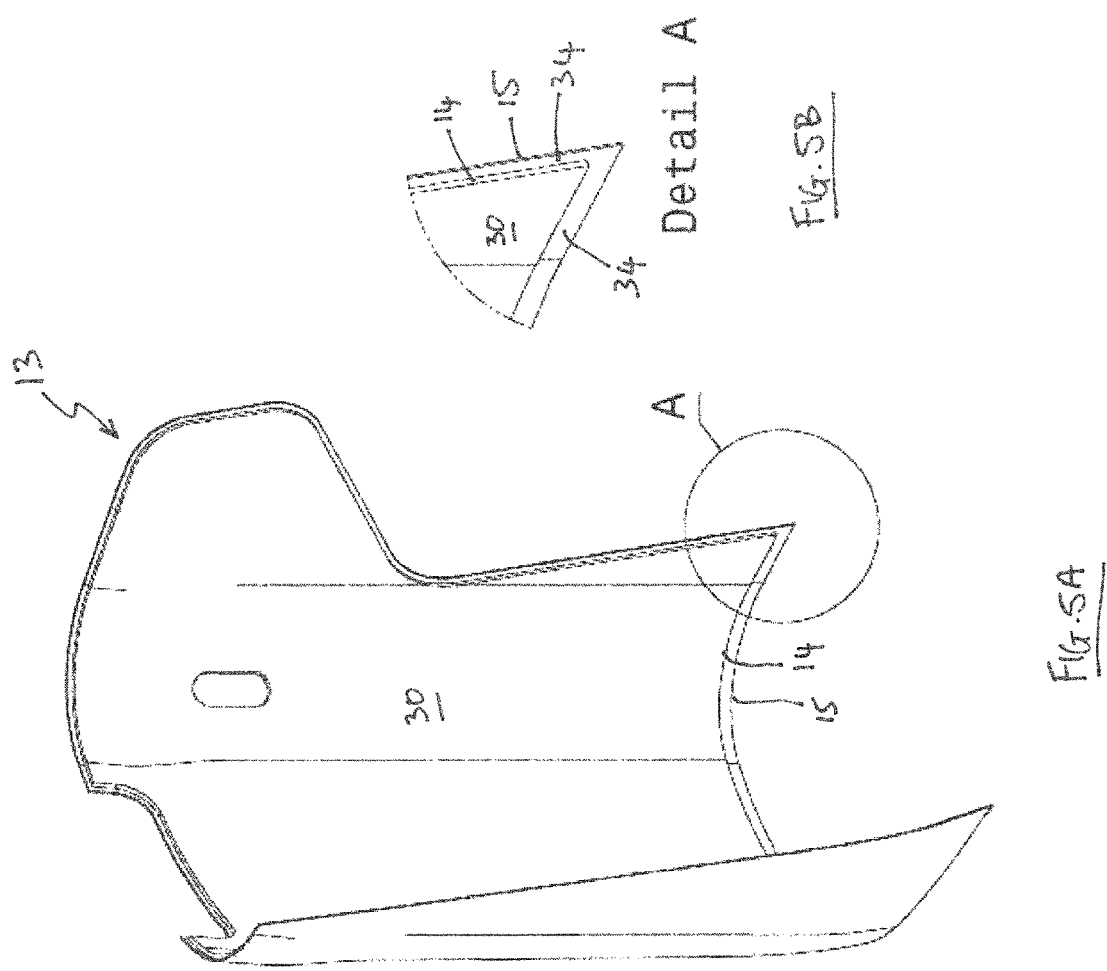

PANEL ASSEMBLY

FIELD OF THE INVENTION

The present invention relates to panel assemblies. The invention relates particularly but not exclusively to panel assemblies for use as upholstery in aircraft.

BACKGROUND OF THE INVENTION

To improve comfort in aircraft it is desirable to provide soft surfaces around a passenger. For example, seats that recline to provide a bed are often provided in a seating installation that includes a shell surrounding the seat and including walls, partitions and other surfaces that a seated or reclined passenger comes into contact with. It is desirable to provide such surfaces with upholstery. However, upholstery materials tend to be more susceptible to damage. This is problematic if the upholstery is an intrinsic part of the installation since it can be difficult and expensive to replace or repair a damaged surface. Also, soft upholstered surfaces tend to me more difficult to clean than hard surfaces and this problem is exacerbated when the upholstery is an integral part of the seating installation since any cleaning must be performed on board the aircraft.

SUMMARY OF THE INVENTION

According to one form of the present invention, a panel assembly includes a base structure, an upholstery component including a layer of resiliently deformable material, the upholstery component covering an obverse face of the base structure, and at least one clip releasably retaining the upholstery component on the base structure, wherein the at least one clip extends along at least part of at least one edge of the panel assembly.

In one aspect, the panel assemblies provide a soft feel to passengers and other users while being sufficiently resilient to regain their original shape after deformation. Moreover, the upholstery component can be easily removed to be cleaned, repaired, or replaced.

In another aspect of the invention a seating installation includes the panel assembly.

In still another aspect, a method of preparing a resilient deformable layer for a panel assembly includes compressing the layer, for example using rollers, to thin the layer by compression.

The panel assembly typically has a plurality of edges, a respective one or more of the clips extending along each edge. The clip or clips may extend along substantially the whole length of the respective edge of the panel assembly. In typical embodiments the at least one clip has first and second opposing jaws and is configured to exert a gripping force substantially perpendicular to the obverse face, which may be planar. Advantageously, the jaws are resiliently biased towards each other into a gripping state.

Preferably, the first jaw releasably engages with an obverse surface of the panel assembly and the second jaw engages with a reverse surface of the panel assembly. It is preferred that the obverse surface is shaped to define a recess for engagement by the first jaw and/or that the reverse surface is shaped to define a recess for engagement with the second jaw, the recess preferably being formed along a respective edge of the panel assembly.

In preferred embodiments the at least one clip comprises an elongate body, at least part of which has a substantially U-shaped or C-shaped cross section. The at least one clip may be formed from flexible resilient material, for example.

Optionally, the upholstery component includes a cover covering at least an obverse face of the resilient deformable layer.

In preferred embodiments, the resiliently deformable layer is made from a layer of foam. The foam may be any one or more of a semi-rigid foam, a memory foam, a closed cell polymer foam, or a compressed foam.

The upholstery component preferably includes a substrate layer, the layer of resiliently deformable material being provided on the substrate layer. Preferably a portion of the substrate layer projects laterally from one or more edges of the resiliently deformable layer. Advantageously the at least one clip engages, in use, with the projecting portion of the substrate layer.

In typical application, the panel assembly is shaped and dimensioned to provide part of an interior structure of a vehicle or personal accommodation environment, for example as part of a seating installation, especially an aircraft seating installation. The base structure may be part of an interior structure of a vehicle or personal accommodation environment.

Optionally, the at least one clip may be a trim rail extending around all or part of an edge of the interior structure.

Further advantageous aspects of the invention will become apparent to those ordinarily skilled in the art upon review of the following description of a specific embodiment and with reference to the accompanying drawings.

These and other objects, advantages and features of the invention will become apparent upon review of the following specification in conjunction with the drawings.

BRIEF DESCRIPTION OF THE DRAWINGS

An embodiment of the invention is now described by way of example and with reference to the accompanying drawings in which:

FIG. 1 is a perspective view of an aircraft seating installation including panel assemblies embodying one aspect of the invention;

FIG. 2 is a side view of the seating installation of FIG. 1;

FIG. 3 is a sectioned plan view of part of the seating installation of FIGS. 1 and 2;

FIG. 5A is a perspective view of an upholstery component being part of a panel assembly embodying one aspect of the invention; and FIG. 5B is an enlarged view of part of the area designated 'A' in FIG. 5A.

DESCRIPTION OF THE PREFERRED EMBODIMENTS

Figure 4:
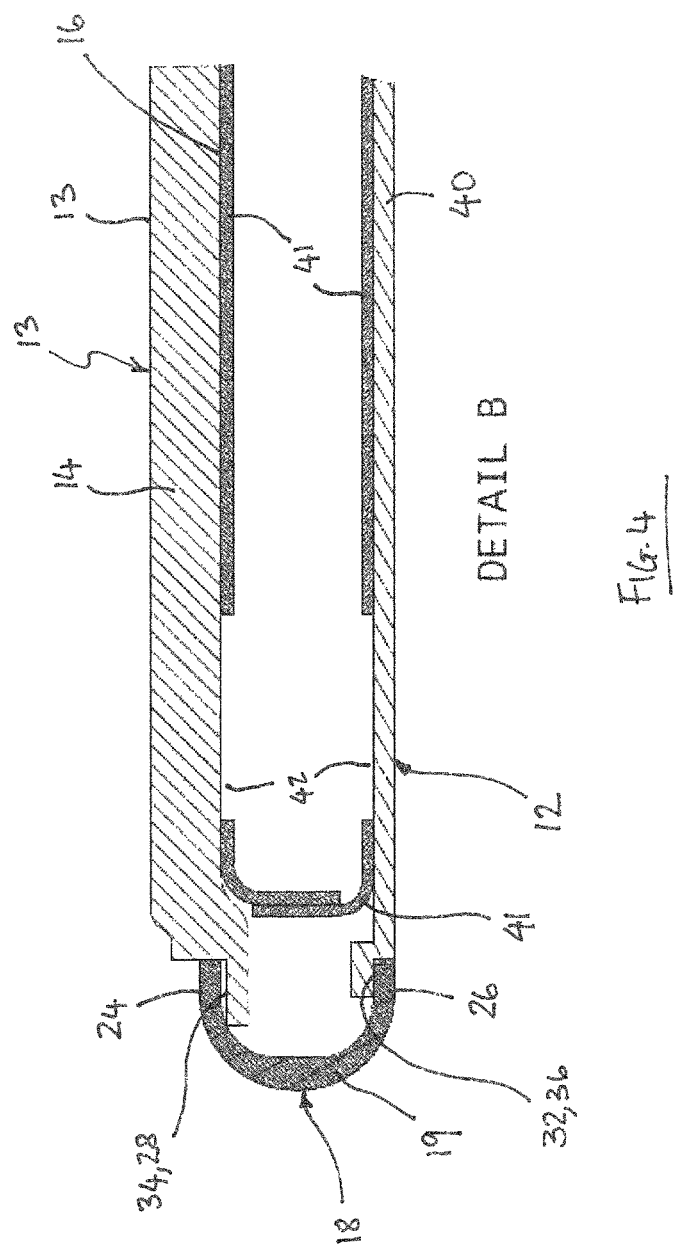
FIG. 4 is an enlarged view of part of the sectioned plan view of FIG. 3.

Referring now to the drawings there is shown generally indicated as 10 a panel assembly embodying one aspect of the invention. The illustrated panel assembly 10 is configured for use as upholstery for a vehicle, especially an aircraft. In particular, the illustrated panel assembly 10 may be used to upholster an aircraft seating installation 2, which includes a shell structure 3 shaped to accommodate one or more seats (not shown), typically seats that recline to serve as a bed. In the example of FIG. 1, the shell structure 3 includes two seat stations S1, S2 and a respective console C1, C2 adjacent each seat station S1, S2. The shell structure 3 typically includes multiple surfaces that a seated or reclined passenger comes into contact with, for example rear seat walls 4, side seat walls 5, console walls 6, console tops 7 and partitions 8. Panel assemblies embodying the invention may be configured, i.e. suitable shaped and sized, to upholster any one or more of such surfaces. In the specific example illustrated in FIGS. 3, 4, 5A and 5B, the panel assembly 10 is shaped and dimensioned to upholster a rear seat wall 4 although it will be understood that the invention is not limited by this.

The panel assembly 10 comprises a base structure 12 and an upholstery component 13 comprising a layer 14 of resiliently deformable material. The upholstery component covers, thereby upholstering, an obverse face 16 of the base structure 12.

The upholstery component 13 is typically located (directly or indirectly) against the obverse face 16 but is removable, i.e. not stuck to the obverse face 16 by any adhesive or other permanent fixing.

The upholstery component 13 is releasably retained on the base structure 12, typically held against the obverse face 16, by at least one clip 18 that extends along at least part of at least one edge 20 of the panel assembly 10.

Typically, the panel assembly 10 has multiple edges 20 and a respective one or more clips 18 may be located along any one or more of the edges 20 as required. In some instances, a respective clip 18 is provided around all of the edges 20 of the panel assembly 10.

Optionally, the clip 18 is dimensioned to extend along substantially an entire respective edge of the panel assembly 10. Alternatively, two or more clips 18 may be provided end-to-end along a respective edge 20.

The panel assembly 10 may include a respective corner 22 between adjacent non-parallel edges 20, a respective separate clip 18 shaped and dimensioned to extend around the corner 22 may be provided or the clip 18 extending along the adjacent edges 20 may be shaped to extend around the corner 22, as is convenient.

In preferred embodiments, the clip 18 has first and second opposing jaws 24, 26. The jaws 24, 26 exert a gripping force that retains the upholstery component 13 on the base structure 12. The gripping force is in a direction that is substantially perpendicular with the obverse face 16. Typically, when gripping, the first jaw 24 engages with an obverse surface 28 of the panel assembly 10, which is typically the obverse surface of the upholstery component 13. The second jaw 26 engages with a reverse surface 32 of the panel assembly 10.

Preferably, one or both of obverse and reverse surfaces 28, 32 are shaped to define a respective recess 34, 36 for receiving the respective jaw 24, 26. The recess 34, 36 is conveniently formed in the respective edge 20 of the panel assembly 10, and may extend along substantially the whole length of the respective edge 20, or at least as long as the length of the corresponding clip 18.

Preferably the clip 18, or at least part of it, is formed from flexible, resilient material and is shaped to be biased into a gripping state such that the first and second jaws 24, 26 are resiliently biased towards one another. For example the flexible resilient material may comprise a metallic material, a polymeric material or a composite material, for example fibre reinforced plastics.

Typically the clip 18 has an elongate body 19, which may be substantially linear or curved to suit the contour of the panel assembly 10. The body 19, or at least a part of the body 19, may have a substantially U-shaped or C-shaped cross section, the legs of the U or C shape serving as a respective one of the jaws 24, 26. In such cases, the body 19, or at least the U or C shaped part of it, may be formed from flexible resilient material. In alternative embodiments, any convenient alternative type of conventional clip may be used, e.g. spring biased scissor clips or wedge clips.

In any event, in preferred embodiments the clip 18 grips the panel assembly 10 holding the upholstery component 13 in place, conveniently by its own resilience.

In typical embodiments, the upholstery component 13 includes a cover 30 that covers at least the obverse face of the layer 14. The cover 30 may cover only the obverse face of the layer 14, or it may cover all of the surfaces of the layer 14. In any case, the cover 30 thus provides the obverse face of the panel assembly 10. The cover 30 may take any convenient form, for example comprising a layer of material applied only to the obverse face of the layer 14, or to more than one surface of the layer 14, for example covering all surfaces of the layer 14. The cover material may be any suitable conventional material for example real leather, artificial leather, fabric or synthetic material. The cover material may be fixed to the layer 14 by any convenient fixing means, typically by adhesive.

In typical embodiments, the resilient deformable layer 14 is formed from foam, preferably a semi-rigid foam. Optionally a memory foam may be used to provide layer 14. The foam may for example be a polymer foam, especially a closed cell polymer foam. For example, semi-rigid foams provided by Zotefoam Plc of Croydon, England under the brand names ZOTE or ZOTEK may be used to provide the layer 14. Advantageously the foam layer 14 is compressed between rollers (not shown) or plates (not shown) prior to its incorporation into the panel assembly 10. The compression typically reduces the depth of the layer 14, for example by approximately 25%. Advantageously, this has the effect of softening the foam and altering its natural resilience to improve its ability to recover its original shape after deformation.

Optionally, the upholstery component 13 includes a substrate layer 15 on which the resiliently deformable layer 14 is mounted. The substrate layer 15 may be fixed directly or indirectly to the reverse face of the resiliently deformable layer 14, i.e. one or more intermediate layers (e.g. part of the cover 30) may be located between the substrate layer 15 and the deformable layer 14. The substrate layer 15 may be fixed in place by any suitable means, conveniently adhesive. The substrate 15 may be dimensioned to project laterally beyond the one or more of the edges of the resiliently deformable layer 14 (as can best be seen from FIGS. 5A and 5B). Conveniently, the projecting portion of the substrate layer 15 defines, together with the edge of the resiliently deformable layer 14, the recess 34. In such embodiments, the clip 18, in particular jaw 24, may grip the projecting portion of the substrate layer 15 to hold the upholstery component 13 to the base structure 12. The cover 30 may cover only the resiliently deformable layer 14 or may also cover the substrate layer 15 (or at least its projecting portion) as desired. In preferred embodiments, the substrate layer 15 is formed from a rigid or semi-rigid material, for example a metallic, polymeric or composite material.

As can best be seen from FIG. 1, advantageously the, or each, clip 18 serves as a trim rail around the periphery of seating installation, or other structure, of which the respective panel assembly 10 is part.

The base structure 12 is typically substantially rigid. The base structure 12 may comprise a back component 40, which is typically rigid or semi-rigid and may comprise a sheet, plate or frame, and may for example be formed from metal, polymeric material or a composite material e.g. fibre reinforced plastics, wood or fiberboard. The back component 40 has a reverse face that provides the reverse face of the base structure 12 and which may also provide the reverse surface 32 in which recess 36 may be formed.

In some embodiments, the obverse face of the back component 40 may provide the obverse face 16 of the base structure 12. In such embodiments, the upholstery component 13 may be held against the obverse face of the back component 40. In other embodiments, including the illustrated embodiment, the base structure 12 includes one or more intermediate structures between the back component 40 and the upholstery component 13, in which case the obverse face 16 is provided by one or more of the intermediate structure(s). In the illustrated embodiment an intermediate structure 41 is provided between the back component 40 and the upholstery component 13, the obverse face of the intermediate structure 41 providing the obverse face 16 of the base structure 12. The intermediate structure 41 is a frame, typically a metal frame (which usually includes weight saving apertures 42), but may take alternative forms in other embodiments.

The base structure 12 may take whatever shape is required by its purpose and may be planar, curved or contoured accordingly. In typical embodiments, the upholstery component 13 is shaped and dimensioned to match the shape and dimensions of the obverse face 16 of the base structure 12.

The base structure 12 may be a standalone structure that may be fitted to another structure, e.g. a seating installation, or may be an integral part of another structure, e.g. a seating installation. In the illustrated embodiment, the base structure 12 is assumed to be part of the shell 3 that provides the rear seat wall 4.

It will be apparent that panel assemblies embodying the invention are particularly suited for use in upholstering the interiors of aircraft, especially an aircraft seating installation, wherein it may be shaped and dimensioned for upholstering any part of the shell 3, or any other surface with which a passenger may come into contact.

Panel assemblies embodying the invention may be alternatively be used upholstering other vehicles, for example, trains, boats or recreational vehicles, or other environments for accommodating people, for example cabins, caravans, mobile homes or theatres.

While panel assemblies embodying the invention are well suited for upholstering seating installations, they may also be used elsewhere, e.g. on walls, partitions, around beds, and on any other surface that is likely to come into contact with a user.

It will be apparent that panel assemblies embodying the invention provide a soft feel to passengers and other users while being sufficiently resilient to regain their original shape after deformation. Moreover, by removing the clips 18, or removing the upholstery component 13 from the clips 18, the upholstery component 13 can be easily removed to be cleaned, repaired, or replaced.

In a preferred manufacturing process, the material from which the layer 14 is formed is cut to the required shape and size after which the layer 14 is crushed, for example between rollers (e.g. using a mangle) or plates to reduce the thickness of the layer 14. This facilitates handling the material including reducing the risk that the layer 14 is marked by fingerprints during the manufacturing process. Next the cover 30 is fixed to the crushed layer 14. The assembled cover 30 and layer 14 may then be vacuum formed and/or trimmed as required. The assembled cover 30 and layer 14 are preferably crushed at least once (e.g. 2 or 3 times) for example between rollers (e.g. using a mangle) or plates.

The invention is not limited by the embodiments described herein which may be modified or varied without departing from the scope of the invention. Therefore, it will be appreciated that changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A panel assembly comprising:
   a base structure;
   an upholstery component comprising a layer of resiliently deformable material, the upholstery component covering an obverse face of said base structure;
   at least one clip releasably retaining said upholstery component on said base structure, said at least one clip having first and second opposing jaws that are resiliently biased towards each other into a gripping state in which said first and second opposing jaws exert a gripping force substantially perpendicular to a plane of said obverse face, to thereby releasably retain said upholstery component on said base structure;
   wherein said at least one clip extends along at least part of at least one edge of the panel assembly, and wherein said at least one clip comprises a trim rail that extends around a periphery of said panel assembly.

2. The panel assembly of claim 1, wherein said panel assembly comprises a plurality of edges, wherein a respective one or more of said at least one clip extends along each of said edges.

3. The panel assembly of claim 1, wherein said at least one clip extends along substantially a whole length of said at least one edge of the panel assembly.

4. The panel assembly of claim 1, wherein said first jaw releasably engages with an obverse surface of said panel assembly and said second jaw engages with a reverse surface of said panel assembly.

5. The panel assembly of claim 4, wherein said obverse surface is shaped to define a first recess for engagement by said first jaw and said reverse surface is shaped to define a second recess for engagement with said second jaw.

6. The panel assembly of claim 5, wherein said first and second recesses are formed along a respective edge of said panel assembly.

7. The panel assembly of claim 1, wherein said at least one clip comprises an elongate body at least part of which has a substantially U-shaped or C-shaped cross section.

8. The panel assembly of claim 1, wherein said upholstery component includes a cover covering at least an obverse face of said resilient deformable layer, and wherein said cover provides the obverse face of said resilient deformable layer.

9. The panel assembly of claim 8, wherein said cover comprises at least one chosen from leather, artificial leather, fabric, and synthetic material.

10. The panel assembly of claim 8, wherein the cover covers a whole of the resiliently deformable layer.

11. The panel assembly of claim 8, wherein the cover is fixed to the resiliently deformable layer by adhesive.

12. The panel assembly of claim 1, wherein the resiliently deformable layer comprises a layer of foam comprising at least one chosen from (i) semi-rigid foam, (ii) memory foam, (iii) closed cell polymer foam, and (iv) compressed foam.

13. The panel assembly of claim 1, wherein said upholstery component includes a substrate layer, and wherein said layer of resiliently deformable material is provided on said substrate layer.

14. The panel assembly of claim 13, wherein a portion of said substrate layer projects laterally from one or more edges of said resiliently deformable layer.

15. The panel assembly of claim 14, wherein said at least one clip engages, in use, with said projecting portion of said substrate layer.

16. The panel assembly of claim 1, wherein said base structure is substantially rigid and comprises a substantially rigid plate or frame.

17. The panel assembly of claim 1, wherein said panel assembly is shaped and dimensioned to provide part of an interior structure of a vehicle or personal accommodation environment.

18. The panel assembly of claim 17, wherein said at least one clip is a trim rail extending around all or part of an edge of said interior structure.

19. The panel assembly of claim 1, wherein said base structure is part of an interior structure of a vehicle or personal accommodation environment.

20. A panel assembly comprising:

a base structure;

an upholstery component comprising a layer of resiliently deformable material, the upholstery component covering an obverse face of said base structure; and at least one clip releasably retaining said upholstery component on said base structure;

wherein said at least one clip extends along at least part of at least one edge of the panel assembly; and wherein said at least one clip has first and second opposing jaws that are resiliently biased towards each other into a gripping state in which said first and second opposing jaws exert a gripping force substantially perpendicular to a plane of said obverse face to releasably retain said upholstery component on said base structure, and wherein said first jaw releasably engages with an obverse surface of said panel assembly and said second jaw releasably engages with a reverse surface of said panel assembly.

* * * * *